United States Patent
Olsson et al.

(10) Patent No.: US 9,907,107 B2
(45) Date of Patent: Feb. 27, 2018

(54) NODES AND METHODS FOR CN NODE SELECTION AT HANDOVER

(71) Applicant: Telefonaktiebolaget L M Ericsson (publ), Stockholm (SE)

(72) Inventors: Lars-Bertil Olsson, Angered (SE); Peter Ramle, Mölnlycke (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 14/433,187

(22) PCT Filed: May 20, 2014

(86) PCT No.: PCT/EP2014/060344
§ 371 (c)(1),
(2) Date: Apr. 2, 2015

(87) PCT Pub. No.: WO2015/176747
PCT Pub. Date: Nov. 26, 2015

(65) Prior Publication Data
US 2016/0270142 A1 Sep. 15, 2016

(51) Int. Cl.
*H04W 36/08* (2009.01)
*H04W 76/02* (2009.01)
(Continued)

(52) U.S. Cl.
CPC ....... *H04W 76/027* (2013.01); *H04L 61/1511* (2013.01); *H04W 8/18* (2013.01);
(Continued)

(58) Field of Classification Search
CPC ........... H04W 36/0022; H04W 72/087; H04W 28/08; H04W 48/18; H04W 88/06
(Continued)

(56) References Cited

U.S. PATENT DOCUMENTS 9,002,361 B2 * 4/2015 Bergquist .............. H04W 12/08
370/331
9,253,704 B1 * 2/2016 Sarkar .................. H04W 36/00
(Continued)

FOREIGN PATENT DOCUMENTS

WO 2013064419 A1 5/2013

OTHER PUBLICATIONS

Author Unknown, "Technical Specification Group Core Network and Terminals; 3GPP Evolved General Packet System (EPS); Evolved General Packet Radio Service (GPRS) Tunnelling Protocol for Control plane (GTPv2-C); Stage 3 (Release 12)," Technical Specification 29.274, Version 12.4.0, 3GPP Organizational Partners, Mar. 2014, 245 pages.

(Continued)

*Primary Examiner* — Cong Tran
(74) *Attorney, Agent, or Firm* — Withrow & Terranova, PLLC

(57) ABSTRACT

The embodiments herein relate to a method in a first target CN node for handling handover of a wireless device from a source CN node to another CN node. The first target CN node receives, from the source CN node, a request message to hand over the wireless device. The first target CN node determines that the first target CN node is unsuitable for handover. The first target CN node determines if there is at least one candidate second target CN node suitable for handover. The first target CN node determines whether the request message should be forwarded to the at least one candidate second target CN node or whether the source CN node should be informed regarding if there is at least one candidate second target CN node that is suitable.

38 Claims, 10 Drawing Sheets

(51) Int. Cl.
H04L 29/12 (2006.01)
H04W 8/18 (2009.01)
H04W 36/38 (2009.01)
H04W 36/00 (2009.01)
H04W 88/06 (2009.01)

(52) U.S. Cl.
CPC ....... *H04W 36/0083* (2013.01); *H04W 36/08* (2013.01); *H04W 36/385* (2013.01); *H04W 36/0061* (2013.01); *H04W 88/06* (2013.01)

(58) Field of Classification Search
USPC .......... 455/436–439; 370/328, 331–332, 338
See application file for complete search history.

(56) References Cited

U.S. PATENT DOCUMENTS

| | | | | |
|---|---|---|---|---|
| 2004/0176094 A1* | 9/2004 | Kim | .................. | H04W 36/0083 455/438 |
| 2010/0027507 A1* | 2/2010 | Li | .................... | H04W 36/0055 370/331 |
| 2011/0274087 A1* | 11/2011 | Liang | .................. | H04W 76/064 370/331 |
| 2011/0275371 A1* | 11/2011 | Roger | .................. | H04W 60/04 455/435.1 |
| 2012/0015656 A1* | 1/2012 | Tiwari | .............. | H04W 36/0055 455/436 |
| 2012/0039181 A1* | 2/2012 | Aziz | .................. | H04W 36/245 370/241 |
| 2013/0003648 A1* | 1/2013 | Hahn | ................ | H04W 36/0005 370/315 |
| 2013/0003697 A1* | 1/2013 | Adjakple | .......... | H04W 36/0011 370/331 |
| 2013/0107863 A1* | 5/2013 | Faccin | .............. | H04W 36/0022 370/331 |
| 2013/0273918 A1* | 10/2013 | Watanabe | ......... | H04W 36/0055 455/436 |
| 2014/0086210 A1* | 3/2014 | Wu | ........................ | H04L 12/66 370/331 |
| 2014/0113637 A1* | 4/2014 | Guan | .................... | H04W 8/082 455/437 |
| 2014/0274059 A1* | 9/2014 | Ramie | .................. | H04W 36/14 455/436 |
| 2015/0215768 A1* | 7/2015 | Dong | ...................... | H04W 8/06 370/328 |
| 2015/0312811 A1* | 10/2015 | Lei | ........................ | H04W 36/38 370/331 |
| 2016/0157283 A1* | 6/2016 | Yu | ..................... | H04W 36/0055 455/437 |

OTHER PUBLICATIONS

Author Unknown, "Technical Specification Group Core Network and Terminals; General Packet Radio Service (GPRS); GPRS Tunnelling Protocol (GTP) across the Gn and Gp interface (Release 12)," Technical Specification 29.060, Version 12.4.0, 3GPP Organizational Partners, Mar. 2014, 180 pages.

Author Unknown, "Technical Specification Group Radio Services and System Aspects; General Packet Radio Service (GPRS) enhancements for Evolved Universal Terrestrial Radio Access Network (E-UTRAN) Access (Release 12)," Technical Specification 23.401, Version 12.4.0, 3GPP Organizational Partners, Mar. 2014, 302 pages.

Author Unknown, "Technical Specification Group Services and System Aspects; Network Sharing; Architecture and functional description (Release 12)," Technical Specification 23.251, Version 12.0.0, 3GPP Organizational Partners, Dec. 2013, 34 pages.

Motorola, "S2-096275: Providing the selected and equivalent PLMN to target eNB in attach and handover," Change Request, 3rd Generation Partnership Project (3GPP), TSG-WG2 Meeting #75E, Oct. 21-28, 2009, 17 pages.

International Search Report for PCT/EP2014/060344, dated Feb. 17, 2015, 4 pages.

International Preliminary Report on Patentability for PCT/EP2014/060344, dated Dec. 1, 2016, 8 pages.

* cited by examiner

NODES AND METHODS FOR CN NODE SELECTION AT HANDOVER

This application is a 35 U.S.C. §371 national phase filing of International Application No. PCT/EP2014/060344, filed May 20, 2014, the disclosure of which is incorporated herein by reference in its entirety.

TECHNICAL FIELD

Embodiments herein relate generally to a first target Core Network (CN) node, a method in the first CN node, a source CN node and a method in the source CN node. More particularly the embodiments herein relate to handling handover of a wireless device from a source CN node to another CN node.

BACKGROUND

3GPP Network Architecture

FIG. 1 illustrates an embodiment of a non-roaming architecture for the Evolved Packet System (EPS). A wireless device 101 may interact with EPS using the Evolved Universal Terrestrial Radio Access Network (E-UTRAN) 105 radio access. Wireless device related control signaling is handled by a Mobility Management Entity (MME) 108 with support of subscription information provided by the Home Subscriber Server (HSS) 110. User payload is handled by the Serving Gateway (S-GW) 115 and the PDN Gateway (P-GW) 118. The P-GW 118 may interact with a Policy and Charging Rules Function (PCRF) 120. A Serving General packet radio service Support Node (SGSN) 123 is responsible for the delivery of data packets from and to the wireless devices 101 within its geographical service area and provides connections for Universal Terrestrial Radio Access Network (UTRAN) 125 and GSM EDGE Radio Access Network (GERAN) 128 networks. GSM is short for Global System for Mobile communications and EDGE is short for Enhanced Data rates for GSM Evolution. The P-GW 118 provides connectivity to packet data network which may comprise an operator's Internet Protocol (IP) Services 130. The packet data network may be an operator external public or private packet data network or an intra-operator packet data network, e.g. for provision of IP Multimedia Subsystem (IMS) services.

Interfaces are allowing the MME 108, S-GW 115 and the P-GW 118 etc. to cooperate with other network elements (e.g. the HSS 110 or the PCRF 120). An interface may also be referred to as a reference point. LTE-Uu is the interface between the wireless device 101 and the E-UTRAN 105. S1-MME is the interface for the control plane protocol between E-UTRAN 105 and the MME 108. S1-U is the interface between E-UTRAN 105 and the S-GW 115 for the per bearer user plane tunnelling and inter eNodeB path switching during handover. S3 is an interface which enables user and bearer information exchange for inter Third Generation Partnership Project (3GPP) access network mobility in idle and/or active state. This interface is between the MME 108 and the SGSN 123. S4 is an interface between the SGSN 123 and the S-GW 115 and provides related control and mobility support between General Packet Radio Service (GPRS) core network and the 3GPP Anchor function of the S-GW 115. S5 is an interface providing user plane tunnelling and tunnel management between the S-GW 115 and the P-GW 118. It is used for S-GW relocation due to wireless device mobility and if the S-GW 115 needs to connect to a non-collocated P-GW 118 for the required Packet Data Network (PDN) connectivity. The S6a interface enables transfer of subscription and authentication data for authenticating/authorizing user access to the evolved system (Authentication, Authorization and Accounting (AAA) interface) between the MME 108 and the HSS 110. The Gx interface provides transfer of (Quality of Service (QoS)) policy and charging rules from the PCRF 120 to Policy and Charging Enforcement Function (PCEF) in the P-GW 118. S10 is an interface between MMEs 108 for MME relocation and MME to MME information transfer. The interface between the MME 108 and the S-GW is the S11 interface. S12 is the interface between UTRAN 125 and the S-GW 115 for user plane tunnelling when Direct Tunnel is established. SGi is the interface between the P-GW 118 and the Operator's IP services 130. The Rx interface resides between the Operator's IP services 130 and the PCRF 120.

The 3GPP network may be organized using network sharing which is that the radio network is shared. At network sharing, the 3GPP standard provides two reference architectures; GateWay Core Network (GWCN) and Multi-Operator Core Network (MOCN). In GWCN, CN nodes such as an MME or an SGSN are shared between the CN operators in addition to the Radio Access Network (RAN). In MOCN, only the radio access network is shared between the CN operators.

The RAN may support wireless device mobility in connected mode by using a handover procedure. The connected mode is one of two operational modes of the wireless device. The other mode is idle mode. In idle mode, after the wireless device has been switched on, it selects a Public Land Mobile Network (PLMN) to connect to. The wireless device searches for a cell of the selected PLMN that can provide available services and camps on the selected cell. In idle mode, the wireless device is identified by parameters such as International Mobile Subscriber Identity (IMSI), Temporary Mobile Subscriber Identity (TMSI) and Packet Temporary Mobile Subscriber Identity (P-TMSI). The RAN does not have any information about idle devices, i.e. information such as location, bearer information etc. The wireless device stays in idle mode until it transmits a request to establish a radio connection. In connected mode, the wireless device transmits and receives data. The wireless device leaves the connected mode and returns to idle mode when a Radio Resource Control (RRC) connection is released or at RRC connection failure. In connected mode, the RAN has information about the connected devices, i.e. information such as location and bearer information etc.

Legacy Mechanisms at Handover—Handover Procedure

At execution of a handover procedure the RAN node that is currently serving the wireless device selects a suitable target cell and signals to the currently serving core node that the wireless device should be moved using a handover procedure. The handover target selected by the RAN node may include a change of 3GPP access.

When current 3GPP radio access is E-UTRAN the evolved Node B (eNodeB) may have access to an information Handover Restriction List. The Handover Restriction List provides the eNodeB with information about allowed and restricted targets and the eNodeB shall use the information if it is provided.

3GPP is currently discussing to allow the MME to perform MME selection in a heterogeneous MME core network by using the same logic as the SGSN does in a MOCN shared network which uses a Common PLMN. The parameter common PLMN is, according to the 3GPP, a PLMN ID indicated in the system broadcast information as defined for conventional networks, which non-supporting wireless devices understand as the serving operator.

In legacy, a Radio Network Controller (RNC) or Base Station Controller (BSC) routes an unknown wireless device to any available SGSN and allows the SGSN to decide if it will accept the request or not. In case of a reject, the SGSN comprises IMSI of the wireless device in the response back to the RNC/BSC. This allows the RAN node to, based on local configuration, select an appropriate SGSN based on the IMSI.

In current discussion at 3GPP SA2 the proposal is to enable the MME to, based on "type of wireless device", decide if the MME will accept to handle the wireless device or not.

Similar to the existing solution to non-supporting shared network in the GERAN/UMTS accesses, the proposed E-UTRAN function for MME selection is to allow an MME selected by eNodeB to reply with a reject back to eNodeB when the MME by support of configuration or subscription information detects that the wireless device shall be served by a different type of MME.

The reject instructs eNodeB to reattempt the request to a different MME based on some criteria, and the anticipated result is that the new MME accepts the request.

However, when a source network during handover shall select a target core MME when the target network is a heterogeneous network with MMEs of different types, there is no mechanism to support the source core node MME/SGSN to select an MME that is serving the matching type of wireless device.

SUMMARY

An objective of embodiments herein is therefore to obviate at least one of the above disadvantages and to provide improved CN node selection at handover.

According to a first aspect, the object is achieved by a method in a first target CN node for handling handover of a wireless device from a source CN node to another CN node. The first target CN node receives a request message from the source CN node. The request message is a request to hand over the wireless device. The first target CN node determines that the first target CN node is unsuitable for handover of the wireless device. The first target CN node determines if there is at least one candidate second target CN node suitable for handover of the wireless device. The first target CN node determines whether the request message should be forwarded to the at least one candidate second target CN node or whether the source CN node should be informed regarding if there is at least one candidate second target CN node that is suitable.

According to a second aspect, the object is achieved by a method in a source CN node for handling handover of a wireless device from the source CN node to another CN node.

The source CN node transmits a request message to a first target CN node. The first message is a request to hand over the wireless device. The source CN node receives a response message from the first target CN node. The response message comprises information regarding if there is at least one candidate second target CN node that is suitable to hand over the wireless device.

According to a third aspect, the objective is achieved by a first target CN node for handling handover of a wireless device from a source CN node to another CN node. The first target CN node is configured to receive a request message from the source CN node. The request message is a request to hand over the wireless device. The first target CN node is further configured to determine that the first target CN node is unsuitable for handover of the wireless device. The first target CN node is further configured to determine if there is at least one candidate second target CN node suitable for handover of the wireless device. The first target CN node is configured to determine whether the request message should be forwarded to the at least one candidate second target CN node or whether the source CN node should be informed regarding if there is at least one candidate second target CN node that is suitable.

According to a fourth aspect, the objective is achieved by a source CN node for handling handover of a wireless device from the source CN node to another CN node. The source CN node is configured to transmit a request message to a first target CN node. The first message is a request to hand over the wireless device. Furthermore, the source CN node is configured to receive a response message from the first target CN node. The response message comprises information regarding if there is at least one candidate second target CN node that is suitable to hand over the wireless device.

Since the first target CN node determines that it is unsuitable to hand over the wireless device, and either forwards the request message to a second target CN node that is suitable or informs the source CN node if there is at least one candidate second target CN node that is suitable, the CN node selection at handover is improved.

Embodiments herein afford many advantages, of which a non-exhaustive list of examples follows:

An advantage of the embodiments herein is that they may provide a generic mechanism for redirection during handover. The embodiments herein may be applied also to legacy shared networks which are based on use of a Common PLMN only.

Another advantage of the embodiments herein is that they may allow a target shared network SGSN to reject a handover attempt and redirect it to an SGSN of a different operator also serving the shared network.

Furthermore, an advantage of the embodiments herein is that they may only impact the core network. The embodiments herein may work with legacy RAN node logic.

The embodiments herein enables identifying that the same request message is sent to a first target CN node and then to a second target CN node in case the first target CN node replies with a reject. The reject may comprise an identifier that allows the source CN node to select the second target CN node (as visible on Gn/Gp, S10, S3 or S16 interfaces).

Another advantage of the embodiments herein is that a target network may be deployed by any kind of heterogeneous structure not known by the source network.

A further advantage of the embodiments herein is that the functionality required by the source side may be merely to compare a value associated with candidate second target CN node(s) to values configured as part of DNS.

The embodiments herein are not limited to the features and advantages mentioned above. A person skilled in the art will recognize additional features and advantages upon reading the following detailed description.

BRIEF DESCRIPTION OF THE DRAWINGS

The embodiments herein will now be further described in more detail in the following detailed description by reference to the appended drawings illustrating the embodiments and in which.

The drawings are not necessarily to scale and the dimensions of certain features may have been exaggerated for the sake of clarity. Emphasis is instead placed upon illustrating the principle of the embodiments herein.

DETAILED DESCRIPTION

Figure 1:
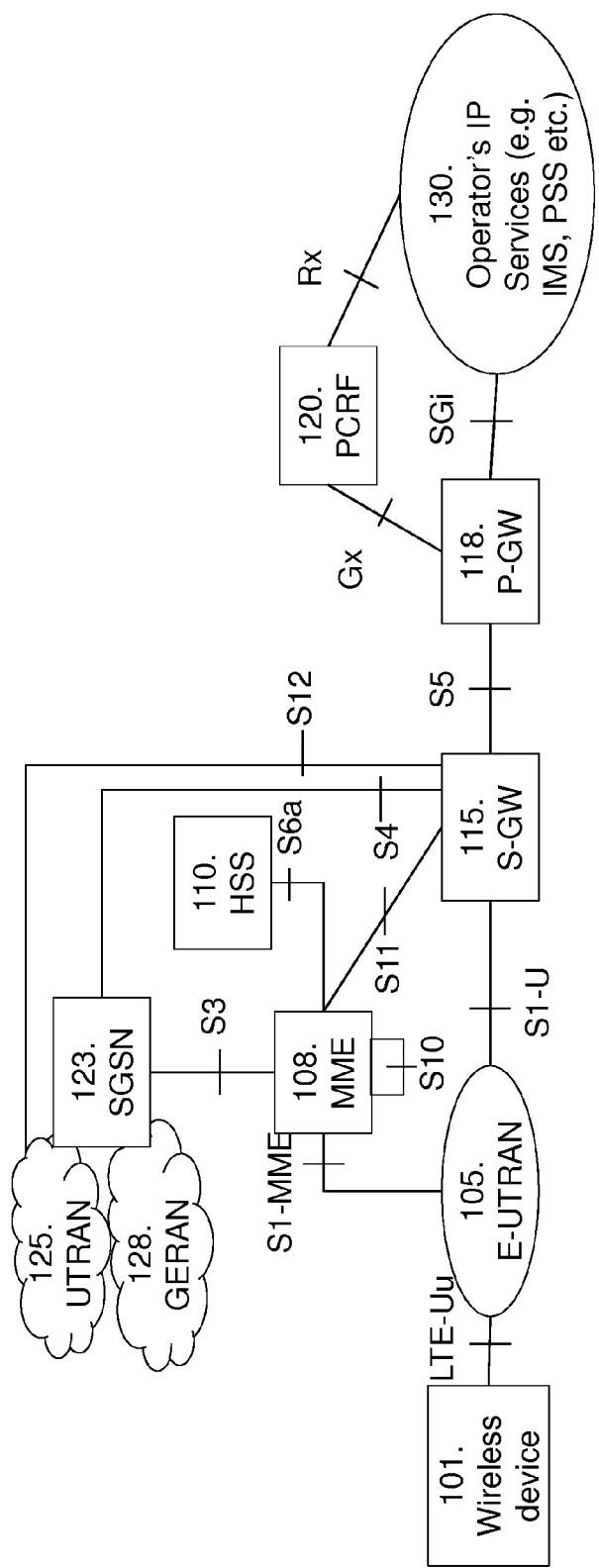
FIG. 1 is a schematic block diagram illustrating embodiments of a non-roaming architecture for EPS.
Figure 2:
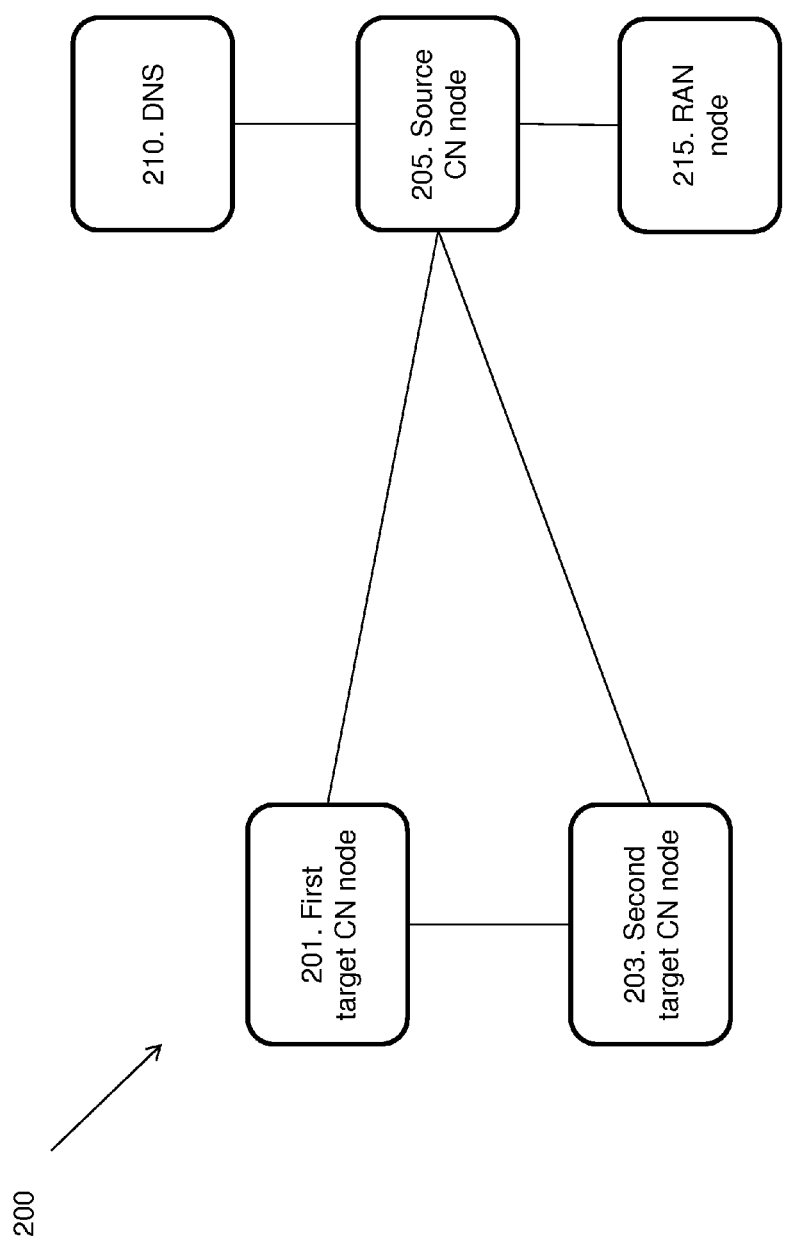
FIG. 2 is a schematic block diagram illustrating embodiments of a communications system.

FIG. 2 depicts a communications system 200 in which embodiments herein may be implemented. The communications network 200 may in some embodiments apply to one or more radio access technologies such as for example Long Term Evolution (LTE), LTE Advanced, Wideband Code Division Multiple Access (WCDMA), Global System for Mobile Communications (GSM), or any other 3GPP access technology, or other access technologies such as e.g. Wireless Local Area Network (WLAN).

The communications system 200 comprises a first target CN node 201, at least one second target CN node 203, a source CN node 205, and a DNS 210. The first target CN node 201, the second target CN node 203, the source CN node 205 and the DNS 210 may be seen as being comprised in a core network of the communications system 200. The first target CN node 201 may be an MME, an SGSN or a combined MME and SGSN. The second target CN node 203 may be an MME, an SGSN or a combined MME and SGSN. The source CN node 205 may be an MME, an SGSN or a combined MME and SGSN. The first target CN node 201 and the second target CN node 203 are located in a target CN and operated by a target operator. The source CN node 205 is located in a source CN and operated by a source operator. The terms target and source will be described in more detail with reference to FIG. 3 below.

In addition to the core network, the communications system 200 may comprise a radio access network. The radio access network comprises a RAN node 215 which may be referred to as a base station, a Node B, an evolved Node B (eNB), a RNC, a BSC etc. The RAN node 215 is capable of communicating with a wireless device (not shown), i.e. the RAN node 215 may be described as serving the wireless devices. The RAN node 215 may be referred to as a source RAN node 215 located in a source RAN.

The following table 1 shows examples of different combinations of the nodes in the communications system 200, where the left most column represents the first target CN node 201, the middle left column represents the second target CN node 203, the middle right column represents the source CN node 205 and the right most column represents the RAN node 215.

TABLE 1

| First target CN node 201 | Second target CN node 203 | Source CN node 205 | RAN node 215 |
| --- | --- | --- | --- |
| MME | MME | MME | NB/eNB/RNC/BSC |
| SGSN | SGSN | SGSN | NB/eNB/RNC/BSC |
| MME/SGSN | MME/SGSN | MME/SGSN | NB/eNB/RNC/BSC |

The wireless device may be a device by which a subscriber may access services offered by an operator's network and services outside operator's network to which the operator's radio access network and core network provide access, e.g. access to the Internet. The wireless device may be any device, mobile or stationary, enabled to communicate in the communications network, for instance but not limited to e.g. user equipment, mobile phone, smart phone, sensors, meters, vehicles, household appliances, medical appliances, media players, cameras, Machine to Machine (M2M) device, Device to Device (D2D) device, Internet of Things (IoT) device or any type of consumer electronic, for instance but not limited to television, radio, lighting arrangements, tablet computer, laptop or Personal Computer (PC). The wireless device may be portable, pocket storable, hand held, computer comprised, or vehicle mounted devices, enabled to communicate voice and/or data, via the radio access network, with another entity, such as another wireless device or a server.

It should be noted that the communication links in the communications system 200 may be of any suitable kind including either a wired or wireless link. The link may use any suitable protocol depending on type and level of layer (e.g. as indicated by the Open Systems Interconnection (OSI) model) as understood by the person skilled in the art.

The method for handling handover of the wireless device from a source CN node 205 to another CN node, according to some embodiments will now be described with reference to the signalling diagram depicted in FIG. 3. At start of the method, the wireless device is handled by the source CN node 205 which is operated by a source CN operator. The method comprises the following steps, which steps may as well be carried out in another suitable order than described below.

Step 300

When the RAN node 215 detects that the wireless device, for some reason, needs to be handed over from the source CN node 205 to another CN node, the RAN node 215 may transmit information to the source CN node 205 regarding that a handover of the wireless device is required. Such information may be transmitted in a handover required message. The information may identify the target operator which operates a target CN, e.g. a target CN operator ID. The target CN operator ID may be associated with a plurality of resources in the target CN to which the wireless device can be handed over. Such resource may be the first target CN node 201.

Step 301

The source CN node 205 may determine the first target CN node 201, for example based on the target CN operator ID from step 300 above.

Step 302

The source CN node 205 transmits a request message to the first target CN node 201. The request message is a request to hand over the wireless device.

For example, when the source CN node 205 is a SGSN/MME, the source SGSN/MME 205 sends a GPRS Tunneling Protocol (GTP) message such as a Forward Relocation Request to a chosen first target CN node 201. I.e. the request message may be a Forward Relocation Request message.

Step 303

The first target CN node 201 determines that it is unsuitable for handover of the wireless device. The decision may be based on at least one of a wireless device type, a wireless device identity, wireless device subscription information and local configuration data comprised in the first target CN node 201. The local configuration data may be information regarding the target network. The first target CN node 201 is unsuitable when for example it does not support the type of wireless device that is to be handed over. Such case may arise when the wireless device requires some specific features that the first target CN node 201 does not support.

So, in step 303, the receiving first target CN node 201 analyzes the request message from step 302 and decides if it accepts the request or not. This may performed by comparing characteristics of wireless device type, wireless device permanent identity, wireless device subscription information, local configuration data etc.

Step 304

The first target CN node 201 determines if there are any candidate second target CN nodes 203 that are suitable for handover of the wireless device. The answer of this step is either yes or now. The result of this step may be that there are no candidate second target CN nodes 203 at all that are suitable for handover, or the result may be that there is at least one candidate second target CN node 203 which is suitable for handover. In the latter case, some information indicating the at least one candidate second target CN node 203 is also determined, e.g. an identity of the at least one candidate second target CN node 203.

Step 305

The first target CN node 201 determines whether to forward the request message to at least one candidate second target CN node 203 or to inform the source CN node 205 regarding if there is at least one candidate second target CN node 203 that is suitable to hand over the wireless device.

The decision may be based on configuration regarding the ability of the source CN node 201 to perform re-routing to a second target CN node 203.

Step 306

This step is indicated with a dotted arrow in order to indicate that it is an optional step, i.e. it is a step which is performed instead of step 307. When the first target CN node 201 determined in step 304 that the request message should be forwarded to at least one candidate second target CN node 203 and that the first target CN node 201 determined in step 304 that there is at least one candidate second target CN node 203, the first target CN node 201 forwards the request message to the determined at least one candidate second target CN node 203. This alternative will be described in more detail with reference to FIG. 4 below.

Step 307

This step is indicated with a dotted arrow in order to indicate that it is an optional step, i.e. it is a step which is performed instead of step 306. In some embodiments, when the first target CN node 201 determined in step 304 that the source CN node 205 should be informed regarding if there is at least one candidate second target CN node 205 that is suitable to hand over the wireless device, the first target CN node 201 transmits, to the source CN node 205, information regarding the at least one candidate second target CN node 203 if such as been determined in step 304. This indirectly informs the source CN node 205 that the first target CN node 201 is unsuitable to hand over the wireless device and that the candidate second target CN node 203 is more suitable than the first target CN node 201. In other embodiments, the source CN node 205 is informed regarding that there is no suitable candidate target CN node 203 at all. This may also be referred to as a total reject of the request message. The step 307 will be described in more detail with reference to FIGS. 5 and 6 below.

Figure 4:
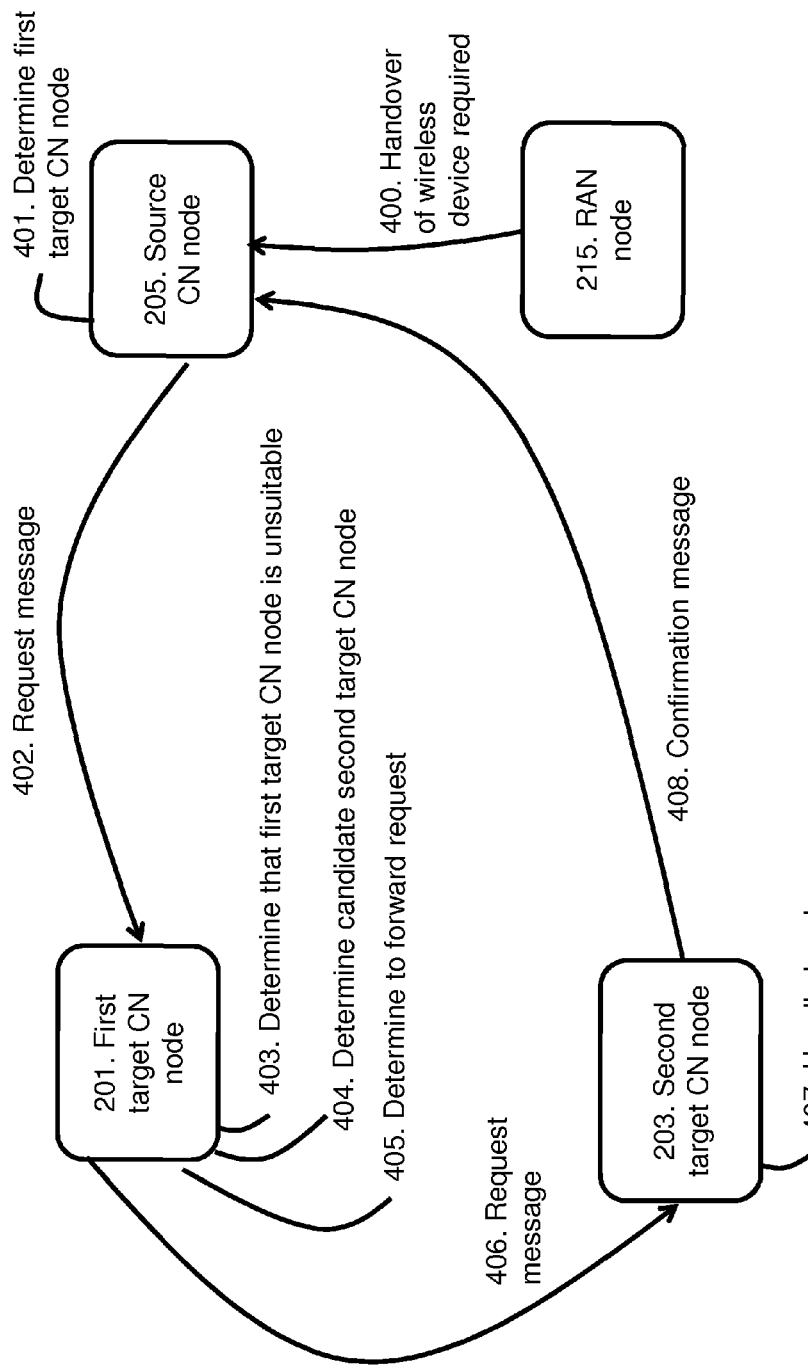
FIG. 4 is a schematic block diagram illustrating embodiments of a method in a communications system where the first target CN node relays the request message.
Figure 5:
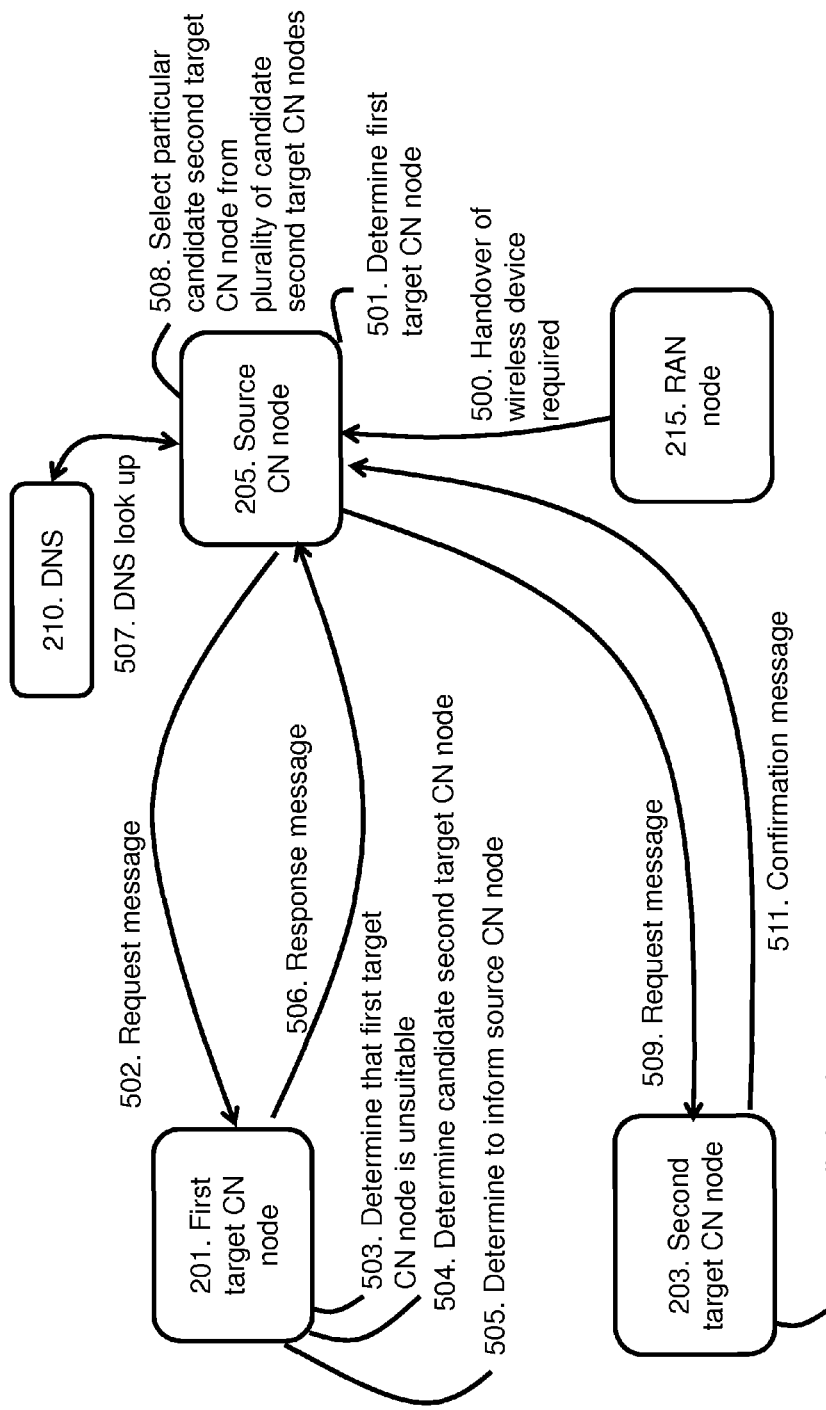
FIG. 5 is a schematic block diagram illustrating embodiments of a method in a communications system where the source CN node retries the transmission of the request message.
Figure 6:
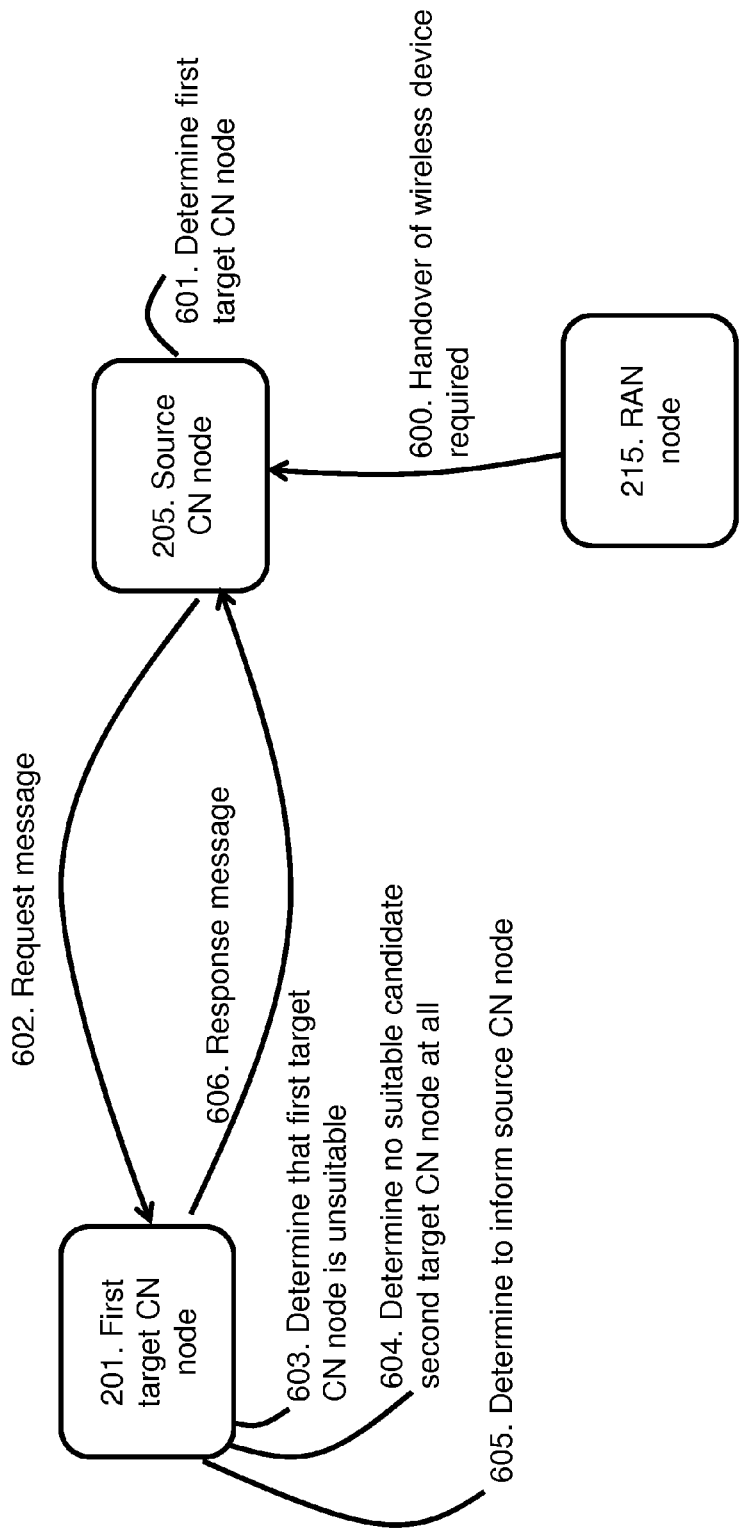
FIG. 6 is a schematic block diagram illustrating embodiments of a method in a communications system where the first target CN node rejects the request message.

Three alternative embodiments will now be described with reference to FIGS. 4, 5 and 6. FIG. 4 illustrates relay of the request message from the first target CN node 201 to the at least one candidate second target CN node 203, FIG. 5 illustrates a retry of transmission of the request message by the source CN node 205, and FIG. 6 illustrates a reject from the first target CN node 201. Each of the FIGS. 4, 5, and 6 uses the embodiment of the communications system 200 depicted in FIG. 2 as a reference. At start of the method in each of the FIGS. 4, 5 and 6, the wireless device is handled by the source CN node 205 which is operated by a source CN operator.

Relay of Request Message by First Target CN Node 203

The method for handling handover of the wireless device from a source CN node 205 to another CN node, according to some embodiments will now be described with reference to the flowchart depicted in FIG. 4. The method comprises the following steps, which steps may as well be carried out in another suitable order than described below.

Step 400

Figure 3:
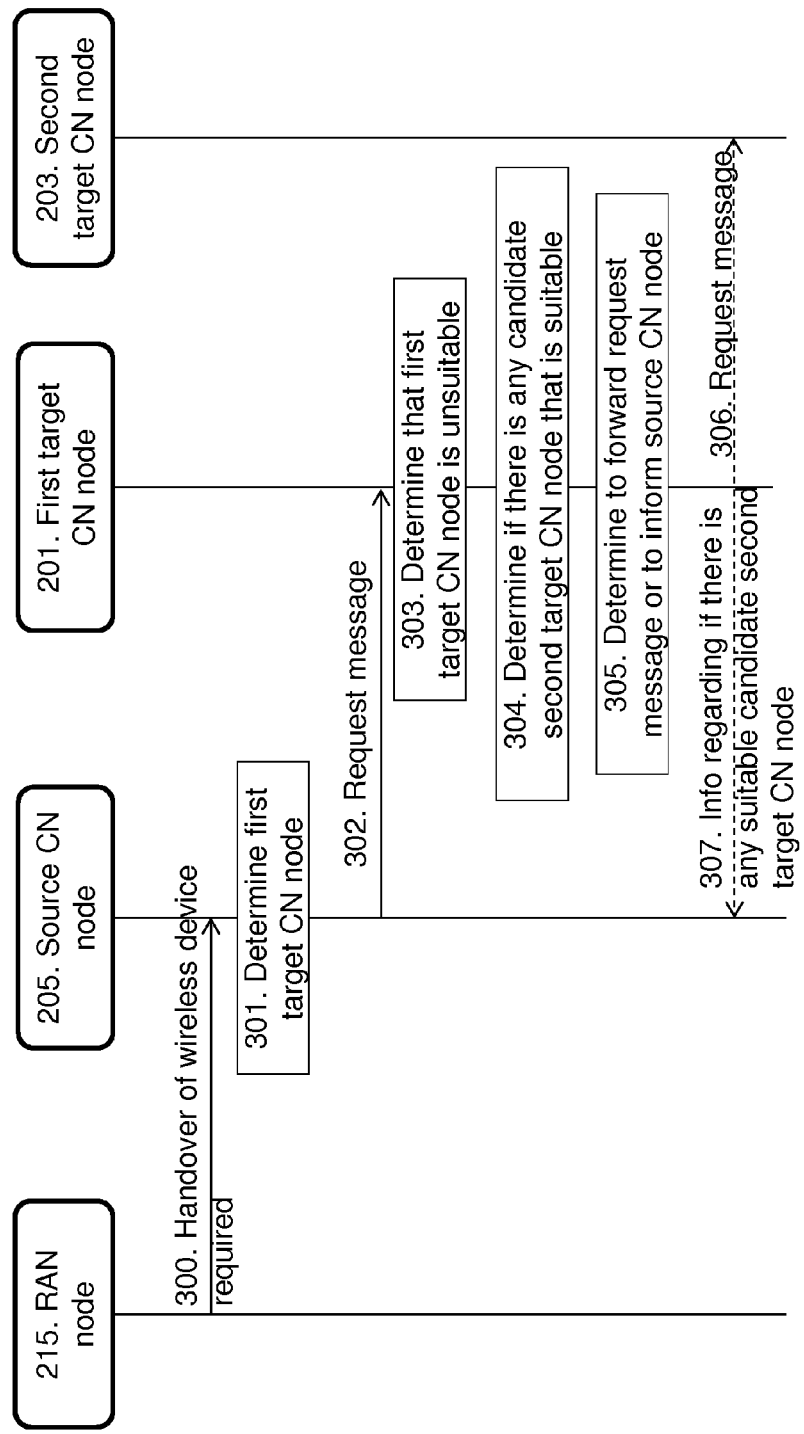
FIG. 3 is a signaling diagram illustrating embodiments of a method in a communications system.

This step corresponds to step 300 in FIG. 3. When the RAN node 215 detects that the wireless device, for some reason, needs to be handed over from the source CN node 205 to another CN node, the RAN node 215 may transmit information to the source CN node 205 regarding that a handover of the wireless device is required. Such information may be transmitted in a handover required message. The information may identify the target operator which operates a target CN, e.g. a target CN operator ID. The target CN operator ID may be associated with a plurality of resources in the target CN to which the wireless device can be handed over. Such resource may be the first target CN node 201.

Step 401

This step corresponds to step 301 in FIG. 3. The source CN node 205 may determine the first target CN node 201, for example based on the target CN operator ID from step 400 above.

Step 402

This step corresponds to step 302 in FIG. 3. The source CN node 205 transmits a request message to the first target CN node 201. The request message is a request to hand over the wireless device.

For example, when the source CN node 205 is a SGSN/MME, the source SGSN/MME 205 sends a GTP message such as a Forward Relocation Request to a chosen first target CN node 201. I.e. the request message may be a Forward Relocation Request message.

Step 403

This step corresponds to step 303 in FIG. 3. The first target CN node 201 determines that it is unsuitable for handover of the wireless device. The decision may be based on at least one of a wireless device type, a wireless device identity, wireless device subscription information and local configuration data comprised in the first target CN node 201. The local configuration data may be information regarding the target network.

So, in step 403, the receiving first target CN node 201 analyzes the request from step 402 and decides if it accepts the request or not. This may performed by comparing characteristics of wireless device type, wireless device permanent identity, wireless device subscription information, local configuration data etc.

Step 404

This step corresponds to step 304 in FIG. 3. The first target CN node 201 determines that there is at least one candidate second target CN node 203 that is suitable for handover of the wireless device, i.e. at least one candidate second target CN node 203 that is more suitable for handover of the wireless device than the first target CN node 201.

The first target CN node 201 and the at least one candidate second target CN node 203 may serve different types of wireless devices but supporting the same service area. When the communication system 200 comprises overlapping pool all nodes do not necessarily support the same service area.

Further criteria for determining the at least one candidate second target CN node 203 may be the field of application for the subscriber, IMSI, the wireless device type, the Evolved Packet Core (EPC) type, the subscription, time of day when the handover occurs or when the wireless device is allowed to transmit data, the load in the communications system 200, priority of the wireless device etc.

As the term at least one candidate second target CN node 203 indicates, there may be one or more candidate second target CN nodes. In some embodiments, the first target CN node 203 may present the source CN node 203 with alternatives of candidate second target CN nodes 203, which may be necessary for example in case all alternatives are not reachable.

Step 405

This step corresponds to step 305 in FIG. 3. The first target CN node 201 determines that the request message should be forwarded to the at least one candidate second target CN node 203.

Step 406

This step corresponds to step 306 in FIG. 3. When the first target CN node 201 has determined in step 405 that the request message should be forwarded, the first target CN node 201 forwards the request message to the at least one candidate second target CN node 203. The request message is a request to hand over the wireless device. The request message may be a GTP Forward Relocation Request message. With this, the first target CN node 201 does not provide any information to the source CN node 205 about its unsuitability or that the request message has been forwarded to the at least one candidate second target CN node.

Step 407

The candidate second target CN node 203 may receive the request message and may handle the handover of the wireless device.

Step 408

When the at least one candidate second target CN node 203 has completed the handover of the wireless device, the at least one candidate second target CN node 203 may send a confirmation message to the source CN node 205. The confirmation message may comprise information confirming that the wireless device has been handed over. In some embodiments, the confirmation message may comprise information regarding that the particular candidate target CN node 203 which has handed over the wireless device. The source CN node 205 may determine that the handover is performed by a CN node which is different from the first target CN node 201 by looking at the IP address of the sender of the confirmation message.

Retry of Transmission of Request Message by Source CN Node 205

The method for handling handover of the wireless device from a source CN node 205 to another CN node, according to some embodiments will now be described with reference to the flowchart depicted in FIG. 5. The method comprises the following steps, which steps may as well be carried out in another suitable order than described below.

Step 500

This step corresponds to step 300 in FIG. 3 and step 400 in FIG. 4. When the RAN node 215 detects that the wireless device, for some reason, needs to be handed over from the source CN node 205 to another CN node, the RAN node 215 may transmit information to the source CN node 205 regarding that a handover of the wireless device is required. Such information may be transmitted in a handover required message. The information may identify the target operator which operates a target CN, e.g. a target CN operator ID. The target CN operator ID may be associated with a plurality of resources in the target CN to which the wireless device can be handed over. Such resource may be the first target CN node 201.

Step 501

This step corresponds to step 301 in FIG. 3 and step 401 in FIG. 4. The source CN node 205 may determine the first target CN node 201, for example based on the target CN operator ID from step 300 above.

Step 502

This step corresponds to step 302 in FIG. 3 and step 402 in FIG. 4. The source CN node 205 transmits a request message to the first target CN node 201. The request message is a request to hand over the wireless device.

For example, when the source CN node 205 is a SGSN/MME, the source SGSN/MME 205 sends a GTP message such as a Forward Relocation Request to a chosen first target CN node 201. I.e. the request message may be a Forward Relocation Request message.

Step 503

This step corresponds to step 303 in FIG. 3 and step 403 in FIG. 4. The first target CN node 201 determines that it is unsuitable for handover of the wireless device. The decision may be based on at least one of a wireless device type, a wireless device identity, wireless device subscription information and local configuration data comprised in the first target CN node 201. The local configuration data may be information regarding the target network.

So, in step 503, the receiving first target CN node 201 analyzes the request message from step 502 and decides if it accepts the request or not. This may performed by comparing characteristics of wireless device type, wireless device permanent identity, wireless device subscription information, local configuration data etc.

Step 504

This step corresponds to step 304 in FIG. 3 and step 404 in FIG. 4. The first target CN node 201 determines at least one candidate second target CN node 203 that is suitable for handover of the wireless device, i.e. at least candidate second target CN node 203 that is more suitable for handover of the wireless device compared to the first target CN node 201. In some embodiment, the first target CN node 201 determines one particular candidate second target CN node 203. In other embodiments, the first target CN node 201 determines a plurality of candidate second target CN nodes 203.

The plurality of candidate second target CN nodes 203 may be indicated with a mark or an indicator. Based on the indicator, the source CN node 205 may filter possible candidate target CN nodes 203 as received from the DNS 210. This will be described in more detail in step 507 and step 508 below.

The first target CN node 201 and the at least one candidate second target CN node 203 may serve different types of wireless devices but supporting the same service area. When the communication system 200 comprises overlapping pool all nodes do not necessarily support the same service area.

A plurality of candidate second target CN nodes 203 may offer the source CN node 201 the possibility to choose among several candidate target CN nodes depending on their availability.

Further criteria for determining the at least one candidate second target CN node 203 may be the field of application for the subscriber, IMSI, the wireless device type, the EPC type, the subscription, time of day when the handover occurs or when the wireless device is allowed to transmit data, the load in the communications system 200, priority of the wireless device etc.

Step 505

This step corresponds to step 305 in FIG. 3. The first target CN node 201 determines that the source CN node 205 should be informed about that there is a at least one candidate second target CN node 203 that is suitable. This indirectly involves informing the source CN node 205 about the unsuitability of the first target CN node 201.

Step 506

This step corresponds to step 307 in FIG. 3. When the first target CN node 201 has determined in step 505 that the source CN node 205 should be informed, the first target CN node 201 transmits a response message to the source CN node 205. The response message comprises information regarding the at least one candidate second target CN node 203 that was determined in step 504. In addition, the response message comprises information regarding that the first target CN node 203 is unsuitable to handover the wireless device. The response message transmitted in step 506 may be seen as a response to the request message in step 502.

As the term at least one candidate second target CN node 203 indicates, there may be one or more candidate second target CN nodes. In some embodiments, the first target CN node 201 presents only one candidate target second CN node 203 to the source CN node 205 in the response message. In other embodiments, the first target CN node 203 may present the source CN node 203 with a plurality of alternatives of candidate second target CN nodes 203, which may be necessary for example in case all candidate second target CN nodes 203 are not reachable.

The information regarding the at least one candidate second target CN node 203 may be in the form of an identity associated with the at least one candidate second target CN node 203. The identity may uniquely identify the at least one candidate second target CN node 203. The associated identity may be any type of identity, for example an integer value. The identity may be used to identify one particular candidate second target CN node 203 or to categorize or group a plurality of candidate second target CN nodes 203 serving a RAN node by means not know to RAN nodes. Examples of the identity may be an IP address. IP address may be suitable when a single second target CN node 203 should be identified. If a plurality of suitable second target CN nodes 203 should be obtained from the DNS 210 some kind of Service Identifier may be provided in the query towards the DNS 210. In the DNS 210 the different nodes may be configured with the services they support. This may be in the form of a Service Identifier. It is a form of matching. For example, the CN nodes may provide up to 27 different services. Some of the nodes support services 1-14 and 26-27 while others support services 13-25. If service 12 is needed to be supported then the number 12 is provided in the query to the DNS 210 will send an answer with only IP addresses for the CN nodes in the first category.

Step 507

In case the first target CN node 203 has provided information regarding a plurality of candidate second target CN nodes 203 in step 506, the source CN node 205 may perform a lookup in a DNS 210 in order to obtain information regarding the plurality of candidate second target CN nodes 203. This lookup may be in the form of retrieving information from the DNS 210. Such information may be for example an identifier in the same format as the identifier described above in step 506. This may be seen as a service supported by some of the candidate second target CN nodes 203 which may provide a way of matching.

Step 508

The source CN node 205 may select a particular candidate second target CN node from the plurality of candidate second target CN nodes 203. The selection may be performed based on at least one of the information in the response message in step 506, e.g. the supplied associated identity, and the information from the DNS 210 in step 507.

The selection may be performed by filtering out possible candidate second target CN nodes 203 based on for example the information in the message in step 306, the information from the DNS 210 etc. about candidate second target CN nodes 203.

There may be at least the following two aspects of the term plurality of candidate second target CN nodes 203:
1) There may be several candidate second target CN nodes 203 of the same category.
2) There may be several candidate second target CN nodes 203 of different categories.

For aspect 1), the first target CN node 201 may perform load balancing and present only one particular candidate second target CN node 203 to the source CN node 205. For aspect 2), the first target CN node 201 may select the candidate second target CN node 203 since all information to decide is available at the first target CN node from the request message in step 302.

The at least one candidate second target CN node 203 is by DNS configuration matching the wireless device type and will accept the request.

So, there may be several second target CN nodes 203 that are suitable to serve the wireless device. Providing the source CN node 205 with this choice gives benefits related above. On the other hand the first target CN node 203 may for example be better to determine the second target CN node 203 from a load balancing point of view.

Step 509

The source CN node 205 may transmit the request message to the at least one candidate second target CN node 203 which was determined by the first target CN node 201 or by the source CN node 205 in step 501. The request message is a request to hand over the wireless device. The source CN node 205 retries the transmission of the request message from step 502, e.g. sends the GTP Forward Relocation Request message to the new node which may be the at least one candidate second target CN node 203 selected of the nodes from the list created in step 508.

Step 510

The at least one candidate second target CN node 203 receives the request message from the source CN node 205, and handles the handover of the wireless device as requested.

Step 511

When the at least one candidate second target CN node 203 has completed the handover of the wireless device, the at least one candidate second target CN node 203 may send a confirmation message to the source CN node 205. The confirmation message comprises information confirming that the wireless device has been handed over to the at least one candidate second target CN node 203. This confirmation message in step 511 may also be seen as a response to the request message in step 502.

So, the embodiment illustrated in FIG. 5 comprises the following two scenarios A and B:

A) The first target CN node 201 determines and indicates to the source CN node 201 one particular suitable candidate target second CN node 203 to use. The source CN node 205 sends the request message to the determined one candidate second target CN node 203.

B) The first target CN node 201 determines and indicates a plurality of candidate second target CN nodes 203 (e.g. in the form of a list) that are equally suitable for handover to the source CN node 205. The source CN node 205 uses the indication of the plurality of candidate second target CN nodes 203 to filter possible candidate target CN nodes 203 as received from the DNS 210 and to select a particular candidate target CN node 203 to be used.

In some embodiments, it is sufficient if the first target CN node 201 determines only one candidate second target CN node 203.

In other embodiments, the source CN node 205 is provided with a list (more than one equally suitable candidate second target CN node 203) because that the source CN node 205 may not have connectivity to all nodes in the list. This embodiment may therefore be regarded as an inherent robustness mechanism and provides an advantage of possibly eliminating communication error cases.

Reject of Request Message by First Target CN Node 201

The method for handling handover of the wireless device from a source CN node 205 to another CN node, according to some embodiments will now be described with reference to the flowchart depicted in FIG. 6. The method comprises the following steps, which steps may as well be carried out in another suitable order than described below.

Step 600

This step corresponds to step 300 in FIG. 3, step 400 in FIG. 4 and step 500 in FIG. 5. When the RAN node 215 detects that the wireless device, for some reason, needs to be handed over from the source CN node 205 to another CN node, the RAN node 215 may transmit information to the source CN node 205 regarding that a handover of the wireless device is required. Such information may be transmitted in a handover required message. The information may identify the target operator which operates a target CN, e.g. a target CN operator ID. The target CN operator ID may be associated with a plurality of resources in the target CN to which the wireless device can be handed over. Such resource may be the first target CN node 201.

Step 601

This step corresponds to step 301 in FIG. 3, step 401 in FIG. 4 and step 501 in FIG. 5. The source CN node 205 may determine the first target CN node 201, for example based on the target CN operator ID from step 500 above.

Step 602

This step corresponds to step 302 in FIG. 3, step 402 in FIG. 4 and step 502 in FIG. 5. The source CN node 205 transmits a request message to the first target CN node 201. The request message is a request to hand over the wireless device.

For example, when the source CN node 205 is a SGSN/MME, the source SGSN/MME 205 sends a GTP message such as a Forward Relocation Request to a chosen first target CN node 201. I.e. the request message may be a Forward Relocation Request message.

Step 603

This step corresponds to step 303 in FIG. 3, step 403 in FIG. 4 and step 503 in FIG. 5. The first target CN node 201 determines that it is unsuitable for handover of the wireless device. The decision may be based on at least one of a wireless device type, a wireless device identity, wireless device subscription information and local configuration data comprised in the first target CN node 201. The local configuration data may be information regarding the target network.

So, in step 603, the receiving first target CN node 201 analyzes the request message from step 602 and decides if it accepts the request or not. This may performed by comparing characteristics of wireless device type, wireless device permanent identity, wireless device subscription information, local configuration data etc.

Step 604

This step corresponds to step 304 in FIG. 3. The first target CN node 201 determines that there is no suitable candidate second target CN node(s) 203 at all. In other words, the first target CN node 201 tries to determine at least one candidate second target CN node 203 but the result of the determination is that there is no one at all.

The criteria for determining the at least one candidate second target CN node 203 may be the field of application for the subscriber, IMSI, the wireless device type, the EPC type, the subscription, time of day when the handover occurs or when the wireless device is allowed to transmit data, the load in the communications system 200, priority of the wireless device etc.

Step 605

This step corresponds to step 305 in FIG. 3 and step 505 in FIG. 5. The first target CN node 201 determines that the source CN node 205 should be informed regarding that there is no suitable candidate target CN nodes 203. This indirectly informs the source CN node 205 regarding the unsuitability of the first target CN node 201.

Step 606

This step corresponds to step 307 in FIG. 3. When the first target CN node 201 has determined in step 605 that the source CN node 205 should be informed, the first target CN node 201 transmits a response message to the source CN node 205. The response message comprises information regarding that there is no candidate second target CN nodes 203 at all to which the wireless device can be handed over. In addition, the response message may comprise information regarding that the first target CN node 201 is unsuitable. The response message transmitted in step 606 may be seen as a response to the request message in step 602.

In some embodiments, the response message may further comprise information regarding that the first target CN node 201 has rejected the request message in step 602.

As the term at least one candidate second target CN node 203 indicates, there may be one or more candidate second target CN nodes. In some embodiments, the first target CN node 203 may present the source CN node 203 with alternatives of candidate second target CN nodes 203, which may be necessary for example in case all alternatives are not reachable.

The information regarding the at least one candidate second target CN node 203 may be in the form of an identity associated with the at least one candidate second target CN node 203. The identity may uniquely identify the at least one candidate second target CN node 203. The associated identity may be any type of identity, for example an integer value. The identity may be used to categorize or group CN nodes serving a RAN node by means not know to RAN nodes. Examples of the identity may be an IP address.

As a result of the rejection of the handover, no handover of the wireless device is performed. When the handover is rejected, the wireless device may decide to move using idle mode mobility which means that the payload may be interrupted for a period of time.

Figure 7:
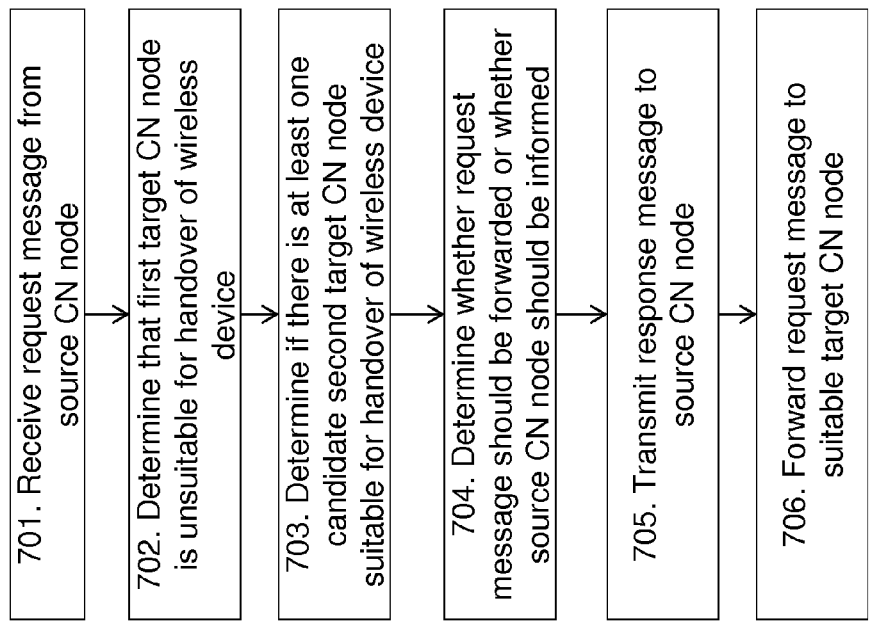
FIG. 7 is a flow chart illustrating embodiments of a method performed by a first target CN node.

The method described above will now be described seen from the perspective of the first target CN node 201. FIG. 7 is a flowchart describing the present method in the first target CN node 201, for handling handover of a wireless device from a source CN node 205 to another CN node. The first target CN node 201 may be an MME or a SGSN or a combined MME and SGSN. The second target CN node 203 may be an MME or an SGSN or a combined MME and SGSN. The source CN node 205 may be an MME or an SGSN or a combined MME and SGSN.

The method comprises the following steps to be performed by the first target CN node 201, which steps may be performed in any suitable order than described below:

Step 701

This step corresponds to step 302 in FIG. 3, step 402 in FIG. 4, step 502 in FIG. 5 and step 602 in FIG. 6. The first target CN node 201 receives a request message from the source CN node 205. The request message is a request to hand over the wireless device.

Step 702

This step corresponds to step 303 in FIG. 3, step 403 in FIG. 4, step 503 in FIG. 5 and step 603 in FIG. 6. The first target CN node 201 determines that the first target CN node 201 is unsuitable for handover of the wireless device.

The decision of that the first target CN node 201 is unsuitable for handover of the wireless device may be based on at least one of a wireless device type, a wireless device identity, wireless device subscription information and local configuration data comprised in the first target CN node 201.

Step 703

This step corresponds to step 304 in FIG. 3, step 404 in FIG. 4, step 504 in FIG. 5 and step 604 in FIG. 6. The first target CN node 201 determines if there is at least one candidate second target CN node 203 suitable for handover of the wireless device.

The first target CN node 201 and the at least one candidate second target CN node 203 may serve different types of wireless devices, support a same service area and are all located in a target network being a heterogeneous network.

Step 704

This step corresponds to step 305 in FIG. 3, step 405 in FIG. 4, step 505 in FIG. 5 and step 605 in FIG. 6. The first target CN node 201 determines whether the request message should be forwarded to the at least one candidate second target CN node 203 or whether the source CN node 205 should be informed regarding if there is at least one candidate second target CN node 203 that is suitable.

The information regarding if there is at least one candidate second target CN node 203 that is suitable may comprise information regarding the at least one candidate second target CN node 203 that is suitable. The information regarding the at least one candidate second target CN node 203 that is suitable may indicate one particular candidate second target CN node 203 or a plurality of candidate second target CN node 203.

The information regarding if there is at least one candidate second target CN node 203 that is suitable comprises information regarding that there is no at least one candidate second target CN node 203 that is suitable.

Step 705

This step corresponds to step 307 in FIG. 3, step 506 and step 606 in FIG. 6. In some embodiments, the first target CN node 201 transmits a response message to the source CN node 205. The response message comprises information regarding if there is at least one candidate second target CN node 203 that is suitable.

Step 706

This step corresponds to step 306 in FIG. 3 and step 406 in FIG. 4. This step may be seen as an alternative step performed instead of step 705. The first target CN node 201 may forward the request message to at least one suitable candidate second target CN node 203.

Figure 8:
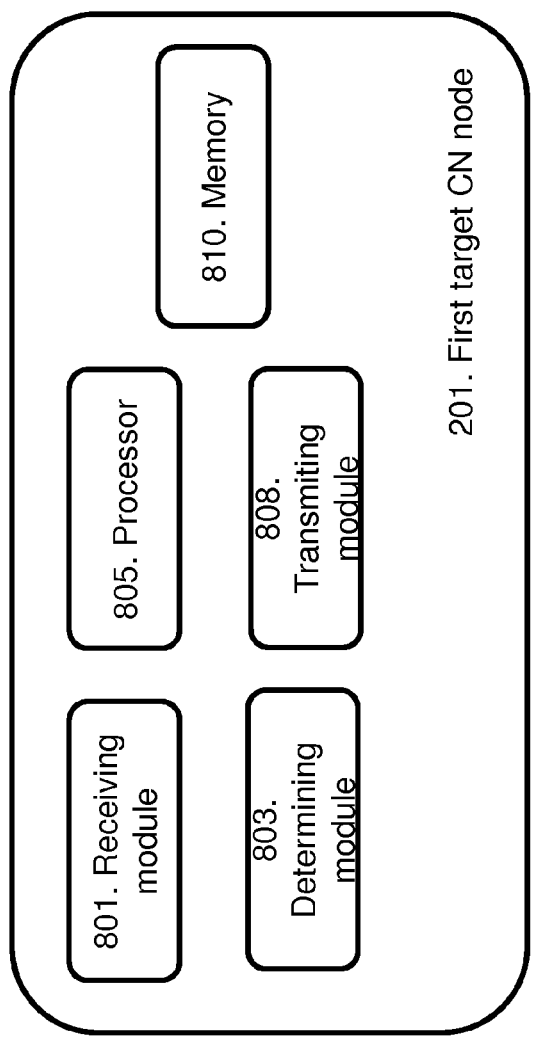
FIG. 8 is a schematic block diagram illustrating embodiments of a first target CN node.

Embodiments of the first target CN node 201 configured to perform the method actions for handling handover of a wireless device from a source CN node 205 to another CN node, as described above in relation to FIGS. 3, 4, 5, 6 and 7, is depicted in FIG. 8. The first target CN node 201 may be a MME or a SGSN or a combined MME and SGSN, the second target CN node 203 may be an MME, or an SGSN or a combined MME and SGSN and the source CN node 205 may be an MME, or an SGSN or a combined MME and SGSN.

The first target CN node 201 for handling handover of a wireless device from a source CN node 205 to another CN node is configured to receive, e.g. by means of a receiving module 801, a request message from the source CN node 205. The request message is a request to hand over the wireless device. The receiving module 801 may also be referred to as a receiving unit, a receiving means, a receiving circuit, means for receiving or an input unit. The receiving module 801 may be a receiver, a transceiver etc. The receiving module 801 may be a wireless receiver of the first target CN node 201 of a wireless or fixed communications system The first target CN node 201 is further configured to determine, e.g. by means of a determining module 803, that the first target CN node 201 is unsuitable for handover of the wireless device. The determining module 803 may be a processor 805 of the first target CN node 201. The determining module 803 may also be referred to as a determining unit, a determining means, a determining circuit or means for determining.

The first target CN node 201 is further configured to determine, e.g. by means of the determining module 803, if there is at least one candidate second target CN node 203 suitable for handover of the wireless device. The first target CN node 201 and the at least one candidate second target CN node 203 may serve different types of wireless devices, support a same service area and are all located in a target network being a heterogeneous network.

The first target CN node 201 is further configured to determine, e.g. by means of the determining module 803, whether the request message should be forwarded to the at least one candidate second target CN node 203 or whether the source CN node 205 should be informed regarding if there is at least one candidate second target CN node 203 that is suitable. The information regarding if there is at least one candidate second target CN node 203 that is suitable may comprise information regarding the at least one candidate second target CN node 203 that is suitable. The information regarding the at least one candidate second target CN node 203 that is suitable may indicate one particular candidate second target CN node 203 or a plurality of candidate second target CN node 203. The information regarding if there is at least one candidate second target CN node 203 that is suitable may comprise information regarding that there is no at least one candidate second target CN node 203 that is suitable.

The first target CN node 201 may be further configured to transmit, e.g. by means of a transmitting module 808, a response message to the source CN node 205. The response message may comprise information regarding if there is at least one candidate second target CN node 203 that is suitable. The transmitting module 808 may also be referred to as a transmitting unit, a transmitting means, a transmitting circuit, means for transmitting or an output unit. The transmitting module 808 may be a transmitter, a transceiver etc. The transmitting module 808 may be a wireless transmitter of the first target CN node 201 of a wireless or fixed communications system The first target CN node 201 may be further configured to forward, e.g. by means of the transmitting module 808, the request message to at least one suitable candidate second target CN node 203.

The first target CN node 201 may be further configured to determine, e.g. by means of the determining module 803, that the first target CN node 201 is unsuitable for handover of the wireless device based on at least one of a wireless device type, a wireless device identity, wireless device subscription information and local configuration data comprised in the first target CN node 201.

The first target CN node 201 may comprise a memory 810 comprising one or more memory units. The memory 810 is arranged to be used to store data, received data streams, request messages, response messages, information regarding the at least one candidate second target CN node 203, wireless device type, wireless device identity, wireless device subscription information and local configuration data, threshold values, time periods, configurations, schedulings etc. and applications to perform the methods herein when being executed in the first target CN node 201.

Those skilled in the art will also appreciate that the receiving module 801, the determining module 803 and the transmitting module 808 described above may refer to a combination of analog and digital circuits, and/or one or more processors configured with software and/or firmware, e.g. stored in a memory, that when executed by the one or more processors such as the processor 805 perform as described above. One or more of these processors, as well as the other digital hardware, may be comprised in a single application-specific integrated circuit (ASIC), or several processors and various digital hardware may be distributed among several separate components, whether individually packaged or assembled into a system-on-a-chip (SoC).

A first computer program may comprise instructions which, when executed on at least one processor, e.g. the processor 805, cause the at least one processor to carry out the method as illustrated in any of the FIGS. 3, 4, 5, 6 and 7. A first carrier may comprise the computer program. The first carrier may one of an electronic signal, optical signal, radio signal or computer readable storage medium, e.g. the memory 810.

Figure 9:
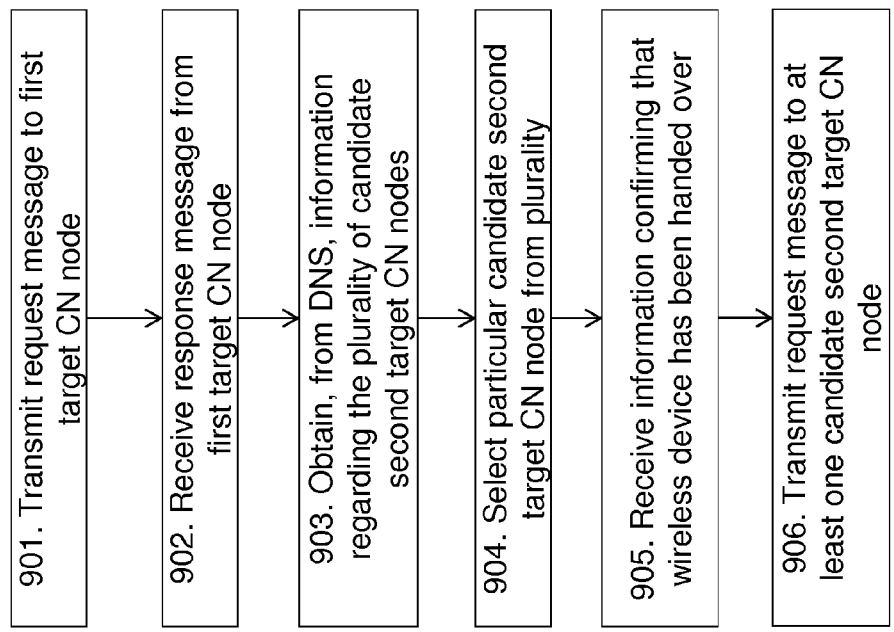
FIG. 9 is a flow chart illustrating embodiments of a method performed by a source CN node.

The method described above will now be described seen from the perspective of the source CN node 205. FIG. 9 is a flowchart describing the present method in the source CN node 205 for handling handover of a wireless device from the source CN node 205 to another CN node. The first target CN node 201 may be a MME or a SGSN or a combined MME and SGSN. The second target CN node 203 may be an MME or an SGSN or a combined MME and SGSN and the source CN node 205 may be an MME, or an SGSN or a combined MME and SGSN. The method comprises the following steps to be performed by the source CN node 205, which steps may be performed in any suitable order than described below:

Step 901

This step corresponds to step 302 in FIG. 3, step 402 in FIG. 4, step 502 in FIG. 5 and step 602 in FIG. 6. The source CN node 204 transmits a request message to a first target CN node 201. The first message is a request to hand over the wireless device.

Step 902

This step corresponds to step 307 in FIG. 3, step 506 in FIG. 5 and step 606 in FIG. 6. The source CN node 305 receives a response message from the first target CN node 201. The response message comprises information regarding if there is at least one candidate second target CN node 203 that is suitable to hand over the wireless device. The first target CN node 201 and the at least one candidate second target CN node 203 may serve different types of wireless devices, support a same service area and are all located in a target network being a heterogeneous network.

The information regarding if there is at least one candidate second target CN node 203 that is suitable may comprise information regarding the at least one candidate second target CN node 203 that is suitable. The information regarding the at least one candidate second target CN node 203 that is suitable may indicate one particular candidate second target CN node 203 or a plurality of candidate second target CN node 203.

The information regarding if there is at least one candidate second target CN node 203 that is suitable may comprise information regarding that there is no at least one candidate second target CN node 203 that is suitable.

Step 903

This step corresponds to step 507 in FIG. 5. In some embodiments, the source CN node 205 obtains, from the DNS 210 information regarding the plurality of candidate second target CN nodes 203.

Step 904

This step corresponds to step 508 in FIG. 5. When the information indicates the plurality, the source CN node 205 may select a particular candidate second target CN node 203 from the plurality of candidate second target CN nodes 203. In some embodiments, the selection of the particular candidate second target CN node 203 is further based on the information obtained from the DNS 210.

Step 905

This step corresponds to step 408 in FIG. 4 and step 511 in FIG. 5. In some embodiments, the source CN node 205 may receive, from the at least one candidate second target CN node 203, information confirming that the wireless device has been handed over to the at least one candidate second target CN node 203.

Step 906

This step corresponds to step 509 in FIG. 5. In some embodiments, the source CN node 205 transmits the request message to the at least one candidate second target CN node 203. The request message may be transmitted 509 to the selected particular candidate second target CN node 203 which was selected in step 904.

Figure 10:
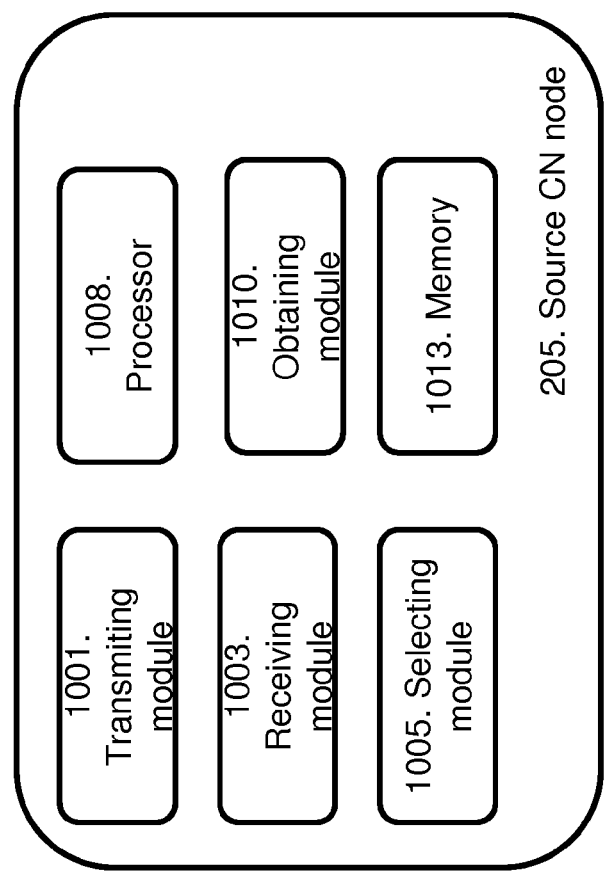
FIG. 10 is a schematic block diagram illustrating embodiments of a source CN node.

Embodiments of the source CN node 205 configured to perform the method actions for handling handover of a wireless device from the source CN node 205 to another CN node, as described above in relation to FIGS. 3, 4, 5, 6 and 9, is depicted in FIG. 10. The first target CN node 201 may be a MME or a SGSN or a combined MME and SGSN. The second target CN node 203 may be an MME, or an SGSN or a combined MME and SGSN and the source CN node 205 may be an MME, or an SGSN or a combined MME and SGSN.

The source CN node 205 for handling handover of a wireless device from the source CN node 205 to another CN node is configured to transmit, e.g. by means of a transmitting module 1001, a request message to a first target CN node 201. The first message is a request to hand over the wireless device. The transmitting module 1001 may also be referred to as a transmitting unit, a transmitting means, a transmitting circuit, means for transmitting or an output unit. The transmitting module 1001 may be a transmitter, a transceiver etc. The transmitting module 1001 may be a wireless transmitter of the source CN node 205 of a wireless or fixed communications system.

The source CN node 205 is configured to receive, e.g. by means of a receiving module 1003, a response message from the first target CN node 201. The response message comprises information regarding if there is at least one candidate second target CN node 203 that is suitable to hand over the wireless device. The first target CN node 201 and the at least one candidate second target CN node 203 may serve different types of wireless devices, support a same service area and are all located in a target network being a heterogeneous network. The receiving module 1003 may also be referred to as a receiving unit, a receiving means, a receiving circuit, means for receiving or an input unit. The receiving module 1003 may be a receiver, a transceiver etc. The receiving module 1003 may be a wireless receiver of the source CN node 205 of a wireless or fixed communications system.

The information regarding if there is at least one candidate second target CN node 203 that is suitable may comprise information regarding the at least one candidate second target CN node 203 that is suitable. The information regarding the at least one candidate second target CN node 203 that is suitable may indicate one particular candidate second target CN node 203 or a plurality of candidate second target CN node 203. The information regarding if there is at least one candidate second target CN node 203 that is suitable may comprise information regarding that there is no at least one candidate second target CN node 203 that is suitable.

The source CN node 205 may be further configured to, when the information indicates the plurality, select, e.g. by means of a selecting module 1005, a particular candidate second target CN node 203 from the plurality of candidate second target CN nodes 203. The selecting module 1005 may also be referred to as a selecting unit, a selecting means, a selecting circuit or a means for selecting. The selecting module 1005 may be a processor 1008 comprised in the source CN node 205.

The request message may be transmitted, e.g. by means of the transmitting module 1001, to the selected particular candidate second target CN node 203.

The source CN node 205 may be further configured to obtain, e.g. by means of an obtaining module 1010, from a DNS 210, information regarding the plurality of candidate second target CN nodes 203. The obtaining module 1010 may also be referred to as an obtaining unit, an obtaining means, an obtaining circuit or a means for obtaining. The obtaining module 1010 may be the processor 1008 of the source CN node 205.

The selection of the particular candidate second target CN node 203, e.g. performed by the selecting module 1005, is further based on the information obtained from the DNS 210.

The source CN node 205 may be further configured to receive, e.g. by means of the receiving module 1003, from the at least one candidate second target CN node 203, information confirming that the wireless device has been handed over to the at least one candidate second target CN node 203.

The source CN node 205 may be further configured to transmit, e.g. by means of the transmitting module 1001, the request message to the at least one candidate second target CN node 203.

The source CN node 205 may comprise a memory 1013 comprising one or more memory units. The memory 1013 is arranged to be used to store data, received data streams, request messages, response messages, information regarding the at least one candidate second target CN node 203, wireless device type, wireless device identity, wireless device subscription information and local configuration data, threshold values, time periods, configurations, schedulings etc. and applications to perform the methods herein when being executed in the source CN node 205.

Those skilled in the art will also appreciate that the transmitting module 1001, the receiving module 1003, the selecting module 1005 and the obtaining module 1010 described above may refer to a combination of analog and digital circuits, and/or one or more processors configured with software and/or firmware, e.g. stored in a memory, that when executed by the one or more processors such as the processor 1008 perform as described above. One or more of these processors, as well as the other digital hardware, may be comprised in a single ASIC, or several processors and various digital hardware may be distributed among several separate components, whether individually packaged or assembled into a SoC.

A second computer program may comprise instructions which, when executed on at least one processor, e.g. the processor 1008, cause the at least one processor to carry out the method as illustrated in any of the FIGS. 3, 4, 5, 6 and 9. A second carrier may comprise the computer program. The second carrier may one of an electronic signal, optical signal, radio signal or computer readable storage medium, e.g. the memory 1013.

The present mechanism for handling handover of a wireless device from the source CN node 205 to another CN node may be implemented through one or more processors, such as a processor 805 in the first target CN node arrangement depicted in FIG. 8 and a processor 1008 in the source CN node arrangement depicted in FIG. 10, together with computer program code for performing the functions of the embodiments herein. The processor may be for example a Digital Signal Processor (DSP), ASIC processor, Field-programmable gate array (FPGA) processor or microprocessor. The program code mentioned above may also be provided as a computer program product, for instance in the form of a data carrier carrying computer program code for performing the embodiments herein when being loaded into at least one of the first target CN node 201 and the source CN node 205. One such carrier may be in the form of a CD ROM disc. It is however feasible with other data carriers such as a memory stick. The computer program code can furthermore be provided as pure program code on a server and downloaded to at least one of the first target CN node 201 and the source CN node 205.

The embodiments herein are not limited to the above described embodiments. Various alternatives, modifications and equivalents may be used. Therefore, the above embodiments should not be taken as limiting the scope of the embodiments, which is defined by the appending claims.

It should be emphasized that the term "comprises/comprising" when used in this specification is taken to specify the presence of stated features, integers, steps or components, but does not preclude the presence or addition of one or more other features, integers, steps, components or groups thereof. It should also be noted that the words "a" or "an" preceding an element do not exclude the presence of a plurality of such elements.

The term "configured to" used herein may also be referred to as "arranged to", "adapted to", "capable of" or "operable to".

It should also be emphasised that the steps of the methods defined in the appended claims may, without departing from the embodiments herein, be performed in another order than the order in which they appear in the claims.

The invention claimed is:

1. A method in a first target core network, CN, node for handling handover of a wireless device from a source CN node to another CN node, the method comprising:
   receiving a request message from the source CN node, wherein the request message is a request to hand over the wireless device;
   determining that the first target CN node is unsuitable for handover of the wireless device;
   determining if there is at least one candidate second target CN node suitable for handover of the wireless device; and
   determining whether the request message should be forwarded to the at least one candidate second target CN node or whether the source CN node should be informed regarding if there is at least one candidate second target CN node that is suitable.

2. The method according to claim 1, further comprising:
   transmitting a response message to the source CN node, wherein the response message comprises information regarding if there is at least one candidate second target CN node that is suitable.

3. The method according to claim 2, wherein the information regarding if there is at least one candidate second target CN node that is suitable comprises information regarding the at least one candidate second target CN node that is suitable.

4. The method according to claim 3, wherein the information regarding the at least one candidate second target CN node that is suitable indicates one particular candidate second target CN node or a plurality of candidate second target CN node.

5. The method according to claim 2, wherein the information regarding if there is at least one candidate second target CN node that is suitable comprises information regarding that there is no at least one candidate second target CN node that is suitable.

6. The method according to claim 1, further comprising:
   forwarding the request message to at least one suitable candidate second target CN node.

7. The method according to claim 1, wherein the determining that the first target CN node is unsuitable for handover of the wireless device is based on at least one of a wireless device type, a wireless device identity, wireless device subscription information and local configuration data comprised in the first target CN node.

8. The method according to claim 1, wherein the first target CN node is a Mobility Management Entity, MME, or a Serving General packet radio service Support Node, SGSN or a combined MME and SGSN, wherein the second target CN node is an MME, or an SGSN or a combined MME and SGSN and wherein the source CN node is an MME, or an SGSN or a combined MME and SGSN.

9. The method according to claim 1, wherein the first target CN node and the at least one candidate second target CN node serve different types of wireless devices, support a same service area and are all located in a target network being a heterogeneous network.

10. A method in a source Core Network, CN, node for handling handover of a wireless device from the source CN node to another CN node, the method comprising:
    transmitting a request message to a first target CN node, wherein the first message is a request to hand over the wireless device; and
    receiving a response message from the first target CN node, wherein the response message comprises information regarding if there is at least one candidate second target CN node that is suitable to hand over the wireless device.

11. The method according to claim 10, wherein the information regarding if there is at least one candidate second target CN node that is suitable comprises information regarding the at least one candidate second target CN node that is suitable.

12. The method according to claim 11, wherein the information regarding the at least one candidate second target CN node that is suitable indicates one particular candidate second target CN node or a plurality of candidate second target CN node.

13. The method according to claim 12, further comprising:
    when the information indicates the plurality, selecting a particular candidate second target CN node from the plurality of candidate second target CN nodes; and
    wherein the request message is transmitted to the selected particular candidate second target CN node.

14. The method according to claim 13, further comprising:
    obtaining, from a Domain Name Server, DNS, information regarding the plurality of candidate second target CN nodes; and wherein the selection of the particular candidate second target CN node is further based on the information obtained from the DNS.

15. The method according to claim 10, wherein the information regarding if there is at least one candidate second target CN node that is suitable comprises information regarding that there is no at least one candidate second target CN node that is suitable.

16. The method according to claim 10, further comprising:
    receiving, from the at least one candidate second target CN node, information confirming that the wireless device has been handed over to the at least one candidate second target CN node.

17. The method according to claim 10, further comprising:
    transmitting the request message to the at least one candidate second target CN node.

18. The method according to claim 10, wherein the first target CN node is a Mobility Management Entity, MME, or a Serving General packet radio service Support Node, SGSN or a combined MME and SGSN, wherein the second target CN node is an MME, or an SGSN or a combined MME and SGSN and wherein the source CN node is an MME, or an SGSN or a combined MME and SGSN.

19. The method according to claim 10, wherein the first target CN node and the at least one candidate second target CN node serve different types of wireless devices, support a same service area and are all located in a target network being a heterogeneous network.

20. A first target core network, CN, node for handling handover of a wireless device from a source CN node to another CN node, the first target CN node being configured to:
receive a request message from the source CN node, wherein the request message is a request to hand over the wireless device;
determine that the first target CN node is unsuitable for handover of the wireless device;
determine if there is at least one candidate second target CN node suitable for handover of the wireless device; and to
determine whether the request message should be forwarded to the at least one candidate second target CN node or whether the source CN node should be informed regarding if there is at least one candidate second target CN node that is suitable.

21. The first target CN node according to claim 20, being further configured to:
transmit a response message to the source CN node, wherein the response message comprises information regarding if there is at least one candidate second target CN node that is suitable.

22. The first target CN node according to claim 21, wherein the information regarding if there is at least one candidate second target CN node that is suitable comprises information regarding the at least one candidate second target CN node that is suitable.

23. The first target CN node according to claim 22, wherein the information regarding the at least one candidate second target CN node that is suitable indicates one particular candidate second target CN node or a plurality of candidate second target CN node.

24. The first target CN node according to claim 21, wherein the information regarding if there is at least one candidate second target CN node that is suitable comprises information regarding that there is no at least one candidate second target CN node that is suitable.

25. The first target CN node according to claim 20, being further configured to:
forward the request message to at least one suitable candidate second target CN node.

26. The first target CN node according to claim 20, being further configured to determine that the first target CN node is unsuitable for handover of the wireless device based on at least one of a wireless device type, a wireless device identity, wireless device subscription information and local configuration data comprised in the first target CN node.

27. The first target CN node according to claim 20, wherein the first target CN node is a Mobility Management Entity, MME, or a Serving General packet radio service Support Node, SGSN or a combined MME and SGSN, wherein the second target CN node is an MME, or an SGSN or a combined MME and SGSN and wherein the source CN node is an MME, or an SGSN or a combined MME and SGSN.

28. The first target CN node according to claim 20, wherein the first target CN node and the at least one candidate second target CN node serve different types of wireless devices, support a same service area and are all located in a target network being a heterogeneous network.

29. A source Core Network, CN, node for handling handover of a wireless device from the source CN node to another CN node, the source CN node being configured to:
transmit a request message to a first target CN node, wherein the first message is a request to hand over the wireless device; and to
receive a response message from the first target CN node, wherein the response message comprises information regarding if there is at least one candidate second target CN node that is suitable to hand over the wireless device.

30. The source CN node according to claim 29, wherein the information regarding if there is at least one candidate second target CN node that is suitable comprises information regarding the at least one candidate second target CN node that is suitable.

31. The source CN node according to claim 30, wherein the information regarding the at least one candidate second target CN node that is suitable indicates one particular candidate second target CN node or a plurality of candidate second target CN node.

32. The source CN node according to claim 31, being further configured to:
when the information indicates the plurality, select a particular candidate second target CN node from the plurality of candidate second target CN nodes;
and wherein the request message is transmitted to the selected particular candidate second target CN node.

33. The source CN node according to claim 32, being further configured to:
obtain, from a Domain Name Server, DNS, information regarding the plurality of candidate second target CN nodes; and wherein the selection of the particular candidate second target CN node is further based on the information obtained from the DNS.

34. The source CN node according to claim 29, wherein the information regarding if there is at least one candidate second target CN node that is suitable comprises information regarding that there is no at least one candidate second target CN node that is suitable.

35. The source CN node according to claim 29, being further configured to:
receive, from the at least one candidate second target CN node, information confirming that the wireless device has been handed over to the at least one candidate second target CN node.

36. The source CN node according to claim 29, being further configured to:
transmit the request message to the at least one candidate second target CN node.

37. The source CN node according to claim 29, wherein the first target CN node is a Mobility Management Entity, MME, or a Serving General packet radio service Support Node, SGSN or a combined MME and SGSN, wherein the second target CN node is an MME, or an SGSN or a combined MME and SGSN and wherein the source CN node is an MME, or an SGSN or a combined MME and SGSN.

38. The source CN node according to claim 29, wherein the first target CN node and the at least one candidate second target CN node serve different types of wireless devices, support a same service area and are all located in a target network being a heterogeneous network.

* * * * *